(12) United States Patent
Kim et al.

(10) Patent No.: US 12,206,695 B2
(45) Date of Patent: Jan. 21, 2025

(54) METHOD OF PROCESSING NETWORK SECURITY POLICY OF ELECTRONIC DEVICE

(71) Applicant: Samsung Electronics Co., Ltd., Gyeonggi-do (KR)

(72) Inventors: Namsoo Kim, Gyeonggi-do (KR); Hongkun Lee, Gyeonggi-do (KR); Myungho Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 17/828,204

(22) Filed: May 31, 2022

(65) Prior Publication Data
US 2022/0329615 A1 Oct. 13, 2022

Related U.S. Application Data

(63) Continuation of application No. PCT/KR2022/004556, filed on Mar. 31, 2022.

(30) Foreign Application Priority Data

Apr. 8, 2021 (KR) ........................ 10-2021-0045843

(51) Int. Cl.
*H04L 9/40* (2022.01)

(52) U.S. Cl.
CPC ...... *H04L 63/1425* (2013.01); *H04L 63/0236* (2013.01); *H04L 63/1416* (2013.01); *H04L 63/20* (2013.01)

(58) Field of Classification Search
CPC ............. H04L 63/1425; H04L 63/0236; H04L 63/1416; H04L 63/20; H04L 63/1408
See application file for complete search history.

(56) References Cited

U.S. PATENT DOCUMENTS 10,091,014 B2   10/2018  Dawes et al.
10,140,073 B2   11/2018  Chang et al.
                (Continued)

FOREIGN PATENT DOCUMENTS

KR   10-2006-0044665 A    5/2006
KR   10-2008-0113087 A   12/2008
              (Continued)

*Primary Examiner* — Bryan Y Lee
(74) *Attorney, Agent, or Firm* — Cha & Reiter, LLC

(57) ABSTRACT

An electronic device and method are disclosed. The electronic device includes a processor and communication circuitry. The processor implements the method, including identifying by the processor a network security policy for a network, receiving by the communication circuitry an authentication request from an external electronic device, transmitting, to the external electronic device, an authentication response to the authentication request, the authentication response including a network security policy for the network, receiving an association request to join the network from the external electronic device after the external electronic device receives the authentication response, transmitting an association response to the association request permitting the external electronic device to join the network, and receiving data traffic for the network from the external electronic device, wherein the network security policy is applied by the external electronic device such that the data traffic received from the external electronic device accords with the network security policy.

10 Claims, 9 Drawing Sheets

(56) References Cited

U.S. PATENT DOCUMENTS

2020/0213909 A1     7/2020   Oh
2022/0159040 A1*   5/2022   Paul ..................... H04L 63/102

FOREIGN PATENT DOCUMENTS

| KR | 10-2012-0047915 A | 5/2012 |
| KR | 10-1502490 B1 | 3/2015 |
| KR | 10-1550192 B1 | 9/2015 |
| KR | 10-2017-0106871 A | 9/2017 |
| KR | 10-2018-0120451 A | 11/2018 |
| KR | 10-1998414 B1 | 7/2019 |
| KR | 10-2019-0102068 A | 9/2019 |
| KR | 10-2019-0105167 A | 9/2019 |

* cited by examiner

| Tag number | Length | OUI | Type |
|---|---|---|---|
| 0xDD (1 octet) | Length of VS (1 octet) | Vendor OUI (3 octet) | 0xEE (1 octet) |

FIG. 5

| Policy type | Length | Policy name | Length | Rule |
|---|---|---|---|---|
| 1 octet | Length of policy name (1 octet) | Name of policy | Length of rule (1 octet) | Rule text |

FIG. 6

| Category | OUI | Subtype | Length | VSIE |
|---|---|---|---|---|
| 127 | Vendor OUI (3 octor) | 0xEE (1 octer) | Length of VSIE (1 octer) | Policy |

FIG. 8

METHOD OF PROCESSING NETWORK SECURITY POLICY OF ELECTRONIC DEVICE

CROSS-REFERENCE TO RELATED APPLICATIONS

This application is a continuation of pending PCT international application number PCT/KR2022/004556, filed on Mar. 31, 2022, which is based on and claims the benefit of a Korean patent application number 10-2021-0045843, filed on Apr. 8, 2021, in the Korean Intellectual Property Office, both disclosures of which are incorporated by reference herein in their entirety.

BACKGROUND

1. Technical Field

The disclosure relates network security, and, more particularly, to verification of transmission data by dissemination of a network security policy to multiple external devices.

2. Description of Related Art

Generally speaking, when wireless electronic devices communicatively couple over network infrastructure, they may generate, transmit and/or receive data traffic. During such operations, the wireless electronic devices may share a certain security policy, which may govern the types of data that are allowed in network communication. If certain data traffic is detected as violating the security policy, they may be restricted in some sense, which may include processing that violative data according to some preset action (e.g., restriction).

When a number of wireless network devices involved in the security policy increases, the computational load for implementing the security policy may increase.

SUMMARY

An electronic device may manage a network security policy, and thus may distribute the network security policy to new external devices connecting to the network on which the electronic device is disposed.

By providing the network security policy to each external device connecting to the network, a plurality of devices may share the load of determining whether data traffic on the network violates the network security policy. Accordingly, computational load for monitoring data traffic may be reduced for the electronic device.

According to certain embodiments described herein, a network security policy for a particular network may be applied identically for each of a plurality of external devices connecting to the network.

According to certain embodiments described herein, when a network security policy is updated on the electronic device, the update may be promulgated to all external electronic devices on the network, allowing continued shared management of data traffic according to the updated network security policy.

According to certain embodiments described herein, when data traffic generated in an external electronic device violates a network security policy, the external electronic device and the electronic device may perform remedial operations defined in the network security policy.

According to an example embodiment, a method in an electronic device is disclosed, including: identifying a network security policy for a network, receiving an authentication request from an external electronic device, transmitting, to the external electronic device, an authentication response to the authentication request, the authentication response including a network security policy for the network, receiving an association request to join the network from the external electronic device after the external electronic device receives the authentication response, transmitting an association response to the association request permitting the external electronic device to join the network, and receiving data traffic for the network from the external electronic device, wherein the network security policy is applied by the external electronic device such that the data traffic received from the external electronic device accords with the network security policy.

According to an example embodiment, a method in an electronic device is disclosed, including: identifying a network security policy for a network, receiving an authentication request from an external electronic device, transmitting, to the external electronic device, an authentication response to the authentication request, receiving an association request to join the network from the external electronic device, transmitting an association response to the association request, transmitting the network security policy through a handshake message with the external electronic device permitting the external electronic device to join the network, and receiving data traffic for the network from the external electronic device, wherein the network security policy is applied by the external electronic device such that at least a first portion of the data traffic received from the external electronic device accords with the network security policy.

According to an example embodiment, a method in an electronic device is disclosed, including: identifying an update to a network security policy for a network, transmitting a first frame to an external electronic device with which the network security policy is shared, wherein the frame includes the update to the network security policy, receiving a verification corresponding to the first frame from the external electronic device, and receiving data traffic for the network from the external electronic device, wherein the update to the network security policy is applied by the external electronic device such that at least a first portion of the received data traffic accords with the update to the network security policy.

According to certain embodiments described herein, computational load may be reduced for an electronic device to which other external devices are connected so as to form a network, by determination on the external electronic devices whether data traffic generated within the external devices violates a network security policy.

According to certain embodiments described herein, when a network security policy for network infrastructure is updated, the updated network security policy may be shared by an electronic device with external electronic devices, and the latest network security policy may thereby be maintained across all devices connected to the network.

According to certain embodiments described herein, when an external electronic device is connected to (or associated with) an electronic device, a network security policy may be rapidly transmitted to the external electronic device as the connection (or association) is established.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 5 is a diagram illustrating an example of elements for transmitting a network security policy according to an embodiment;

FIG. 6 is a diagram illustrating an example of a network security policy provided to an external electronic device according to an embodiment;

FIG. 8 is a diagram illustrating an example of a frame for providing an updated network security policy according to an embodiment.

DETAILED DESCRIPTION

Figure 1:
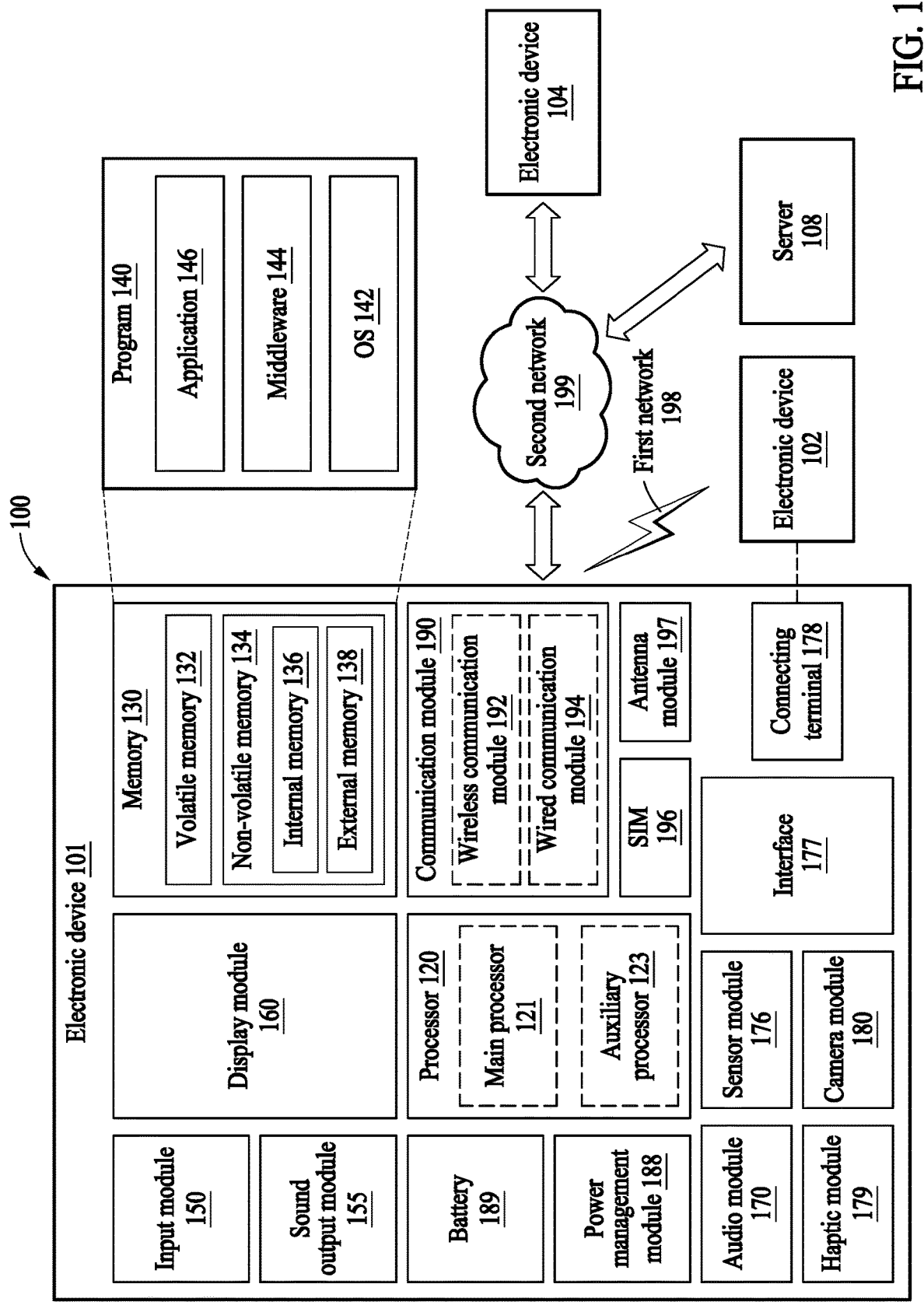
FIG. 1 is a block diagram illustrating an example electronic device in a network environment according to certain embodiments.

Hereinafter, various example embodiments will be described in greater detail with reference to the accompanying drawings. When describing the example embodiments with reference to the accompanying drawings, like reference numerals refer to like elements and a repeated description related thereto will be omitted. The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings, and like reference numerals in the drawings refer to like elements throughout.

FIG. 1 is a block diagram illustrating an example electronic device in a network environment according to certain embodiments.

FIG. 1 illustrates an electronic device 101 in a network environment 100 according to certain embodiments.

According to certain embodiments, an electronic device may be a device having a wireless communication function. The electronic device may include, as non-limiting examples, a smartphone, a tablet computer, a portable telephone terminal, a laptop computer, a wearable electronic device such as a smartwatch, a portable game device, a navigation device, a multimedia playing device, a headset device, and the like.

The electronic device may support one or more types of wireless communication functions. Wireless communication may include, for example, cellular network communication, short-range wireless network communication (e.g., Wi-Fi, etc.), wireless local area network communication (e.g., Bluetooth, etc.), global positioning system (GPS) communication, near-field communication (NFC), and the like.

The electronic device may include one or more antennas for supporting such wireless communication functions. The antennas may transmit or receive signals through wireless communication. A single antenna may support a single type of wireless communication, or support two or more types of wireless communication in a combined way.

Referring to FIG. 1, the electronic device 101 in the network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to various example embodiments, an electronic device may be a device of one of various types. The electronic device may include, as non-limiting examples, a portable communication device (e.g., a smartphone, etc.), a computing device, a portable multimedia device, a portable medical device, a camera, a wearable device, or a home appliance. However, the electronic device is not limited to the foregoing examples.

It should be construed that various example embodiments of the present disclosure and the terms used therein are not intended to limit the technological features set forth herein to some particular embodiments but include various changes, equivalents, or replacements of the example embodiments. In connection with the description of the drawings, like reference numerals may be used for similar or related components. It should be understood that a singular form of a noun corresponding to an item may include one or more of the things, unless the relevant context clearly indicates otherwise. As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component according to the concept of the present disclosure. It should also be understood that, when a component (e.g., a first component) is referred to as being "connected to" or "coupled to" another component with or without the term "functionally" or "communicatively," the component can be connected or coupled to the other component directly (e.g., wiredly), wirelessly, or via a third component.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various example embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Figure 2:
FIG. 2 is a diagram illustrating an example of sharing a network security policy between an electronic device and an external electronic device according to an embodiment.

FIG. 2 is a diagram illustrating an example of sharing a network security policy from an electronic device to an external electronic device according to an embodiment.

Referring to FIG. 2, an external electronic device 102 may access an electronic device 101. The external electronic device 102 may generate data traffic and provide the data traffic to network infrastructure via the electronic device 101. The electronic device 101 may be, for example, a network device such as an access point or a router. The external electronic device 102 may be, for example, a client terminal or a station accessing the electronic device 101, and providing the data traffic to the network infrastructure according to a specific predefined standard (e.g., IEEE 802.11).

The external electronic device 102 may include the same components as the electronic device 101 illustrated in FIG. 1. Although not illustrated in FIG. 2, one or more external electronic devices (e.g., the external electronic device 102) may be connected to the single electronic device (e.g., the electronic device 101, so as to access the network through the electronic device 101).

The electronic device 101 may provide a network security policy to the external electronic device 102. The network security policy may be applied to the electronic device 101 via a network manager. The network security policy, as managed by the electronic device 101, may be provided from the electronic device 101 to the external electronic device 102 before the external electronic device 102 is connected to (hereinafter "associated with") the electronic device 101. For example, the network security policy may include rules with which the external electronic device 102 complies for transceiving data over the corresponding network, such as for example, rules forbidding usage of a specific application, access of a specific website, access to a specific forbidden Internet protocol (IP) address, transmission of data equal to or greater than a particular size or capacity, and the like.

The network security policy may include, for example, an access control list, a quality of service (QoS) requirement, or a rate limit. The access control list may be used to search for specific information such as a preset IP from a packet transmitted through a network and perform a preset action (e.g., drop or allow) when the information is found in the packet.

The QoS may determine a priority for transmission of packets through the network. For example, a packet with a high QoS may be prioritized so as to be transmitted before a packet with a low QoS.

The rate limit may be used to transmit, at a preset rate, a packet corresponding to a preset IP from among packets to be transmitted through a network. For example, the packet corresponding to the preset IP may be transmitted at a relatively higher rate compared to other packets, or at a relatively lower rate compared to other packets. The rate limit may be set in units of kilobits per second (Kbps), for example.

The network security policy may be shared from the electronic device 101 to the external electronic device 102 via an authentication process, before the external electronic device 102 completes communicative association with the electronic device 101. Synchronization between the electronic device 101 and the external electronic device 102 for the network security policy may be performed, before the external electronic device 102 completes associated with the electronic device 101.

The external electronic device 102 may determine whether data traffic for transmission over a network meets the network security policy shared by the electronic device 101. Data traffic that violates the network security policy may be filtered out by the external electronic device 102, prior to transmission to the electronic device 101. Thus, the electronic device 101 may not be required receive a totality of data traffic from a plurality of external electronic devices (e.g., the external electronic device 102) and then determine whether instances of the received data traffic violates the network security policy, as this process is executed by the external electronic devices prior to transmission to the electronic device 101. Thus, computational load on the electronic device 101 to examine all the data traffic may be reduced, and computing resources of the electronic device 101 may be utilized to focus on processing data traffic complying with the network security policy.

The network security policy may be updated by the network manager of the network infrastructure. When the network security policy is updated, a rule may be added to, deleted from, or modified within the network security policy. The updated network security policy may also be provided from the electronic device 101 to the external electronic device 102, to ensure constancy of the network security policy across all associated devices.

Figure 3:
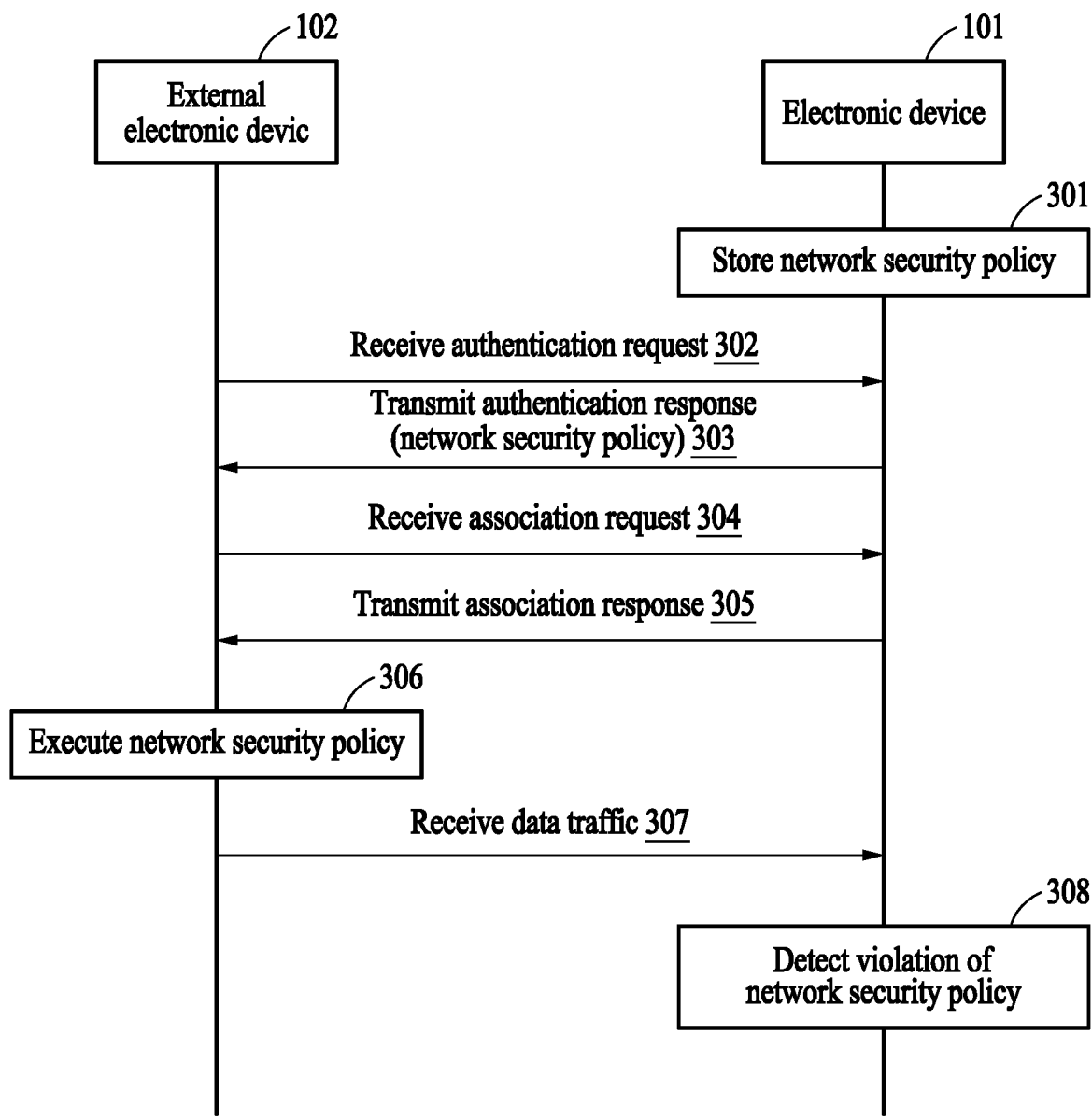
FIG. 3 is a diagram illustrating an example of providing a network security policy to an external electronic device according to an embodiment.

FIG. 3 is a diagram illustrating an example of providing a network security policy to an external electronic device according to an embodiment.

Operations to be described hereinafter with reference to FIG. 3 may be performed by a processor (e.g., the processor 120 of FIG. 1) of an electronic device 101. The operations may relate to a process in which an external electronic device 102 accesses the electronic device 101 through open authentication. Open authentication may not require an encryption key between the electronic device 101 and the external electronic device 102. Open authentication may be used as a common means that assigns a right for accessing websites or applications for information of the external electronic device 102 on other websites, without providing a password.

The operations to be described hereinafter with reference to FIG. 3 are not necessarily be performed in sequential order. It is understood the order indicated in FIG. 3 services as an example and other variations on the same are contemplated.

In operation 301, the electronic device 101 may store a network security policy. The network security policy may be input to the electronic device 101 by a network manager, or may be received from network infrastructure.

In operation 302, the electronic device 101 may receive an authentication request from the external electronic device 102.

In operation 303, the electronic device 101 may transmit an authentication response to the external electronic device 102. The network security policy may be included in the authentication response. For example, a vendor-specific information element (VSIE) for the network security policy may be included in the authentication response. The network security policy may be shared from the electronic device 101 to the external electronic device 102 through an authentication process, before the external electronic device 102 is communicably associated with the electronic device 101.

In operation 304, the electronic device 101 may receive an association request from the external electronic device 102.

In operation 305, when the association between the electronic device 101 and the external electronic device 102 is completed, the electronic device 101 may transmit an association response to the external electronic device 102.

In operation 306, the network security policy provided by the electronic device 101 to the external electronic device 102 may be executed by the external electronic device 102. The external electronic device 102 may then determine, for data traffic pending transmission to the electronic device 101, whether the data traffic violates the network security policy by applying the network security policy shared by the electronic device 101.

Although not illustrated in FIG. 3, an operation of determining whether data traffic generated in the external electronic device 102 violates the network security policy may be executed by the external electronic device 102. When the data traffic generated in the external electronic device 102 violates the network security policy, the external electronic device 102 may apply a preset action to the data traffic. The network security policy may thus be used for filtering certain types of data, enabling the external electronic device 102 to determine whether generated data traffic is licit for transmission to the network through the electronic device 101.

For example, the external electronic device 102 may discard the data traffic that violates the network security policy. The external electronic device 102 may provide a notification indicating a violation of the network security policy by certain data traffic, through a display (e.g., the display module 160 of FIG. 1) of the external electronic device 102. Furthermore, when a count of violations of the network security policy exceeds a preset number for a particular external electronic device 102, the violations may be reported to the electronic device 101 so as to cause the same to cancel the communicative association between the electronic device 101 and the external electronic device 102, and/or prevent re-access of the external electronic device 102.

In operation 307, the electronic device 101 may receive data traffic pre-filtered to meet the network security policy from the external electronic device 102.

In operation 308, the electronic device 101 may detect whether the data traffic received from the external electronic device 102 violates the network security policy. Through operation 306 described above, whether the data traffic violates the network security policy may be determined primarily by the external electronic device 102. Through operation 308 described above, whether the data traffic violates the network security policy may be additionally determined by the electronic device 101 after reception.

According to an embodiment, the external electronic device 102 may determine whether the entire data traffic violates the network security policy, and the electronic device 101 may sample a portion of the data traffic and determine whether the portion of the data traffic violates the network security policy.

According to an embodiment, a method of processing a network security policy performed by an electronic device (e.g., the electronic device 101 of FIG. 1 or 3) may include operation 301 of identifying a network security policy for network infrastructure, operation 302 of receiving an authentication request from an external electronic device (e.g., the electronic device 102 of FIG. 3) to be associated with the electronic device 101, operation 303 of transmitting an authentication response to the authentication request to the external electronic device 102, operation 304 of receiving an association request from the external electronic device 102 receiving the authentication response, operation 305 of transmitting an association response to the association request, and operation 307 of receiving data traffic satisfying the network security policy from the external electronic device 102 to which the network security policy is applied. In the method, the authentication response may include the network security policy.

The network security policy may be shared from the electronic device 101 to the external electronic device 102 through the authentication response based on a VSIE (e.g., vendor characteristic information of FIG. 6).

The VSIE may include at least one of a type of the network security policy, a length of the network security policy, a name of the network security policy, a length of a rule, or a content of the rule.

The network security policy may be shared by the electronic device 101 in an authentication process before the external electronic device 102 is associated with the electronic device 101.

The data traffic to be transmitted to the electronic device 101 may be transmitted to the electronic device 101 when the data traffic does not violate the network security policy applied to the external electronic device 102.

Figure 4:
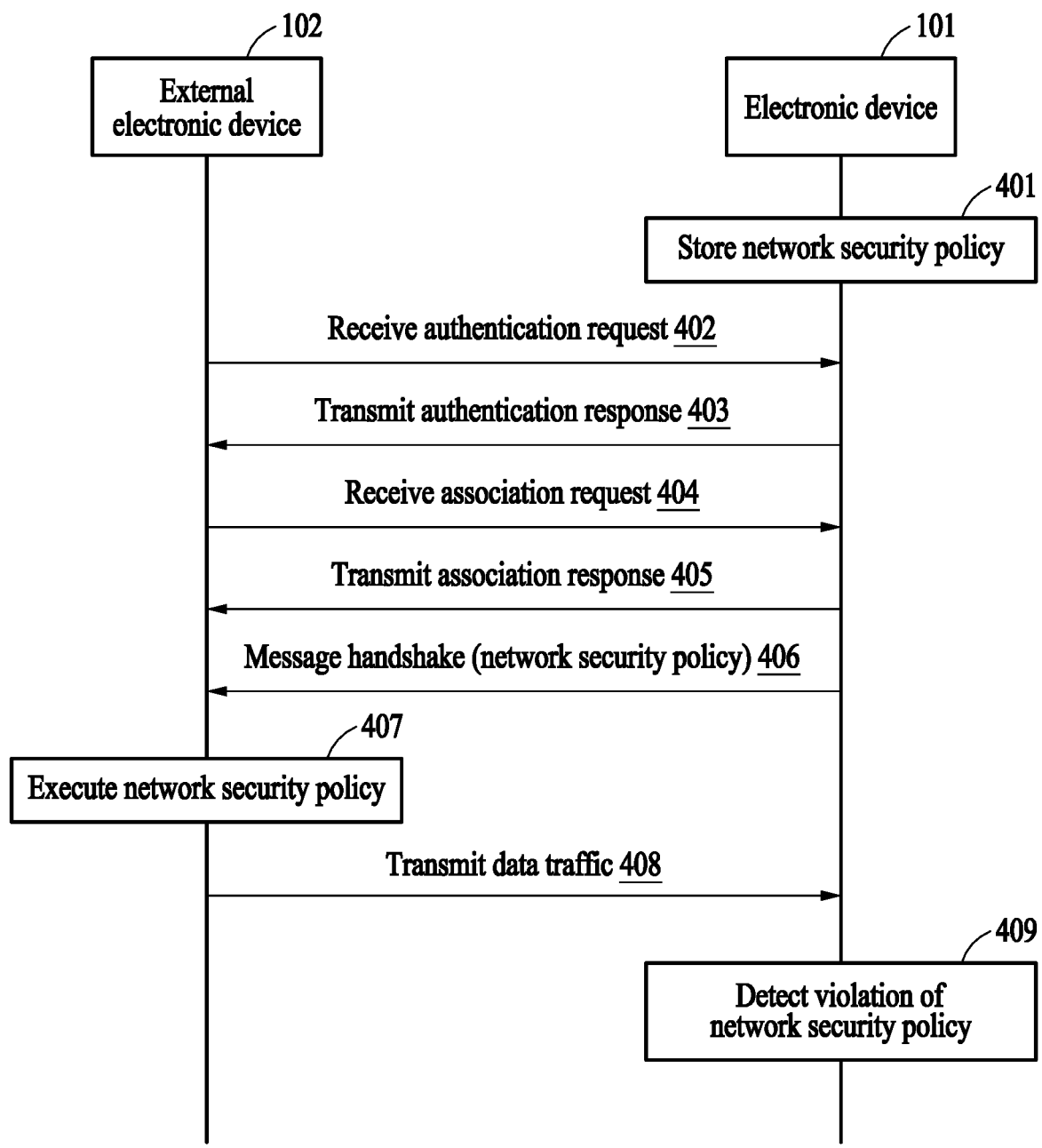
FIG. 4 is a diagram illustrating another example of providing a network security policy to an external electronic device according to an embodiment.

FIG. 4 is a diagram illustrating another example of providing a network security policy to an external electronic device according to an embodiment.

Operations to be described hereinafter with reference to FIG. 4 may be performed by a processor (e.g., the processor 120 of FIG. 1) of an electronic device 101. The operations may relate to a process in which an external electronic device 102 accesses the electronic device 101 through security authentication (e.g., Wi-Fi protected access 2—pre-shared key (WPA2-PSK), 802.1x). Security authentication may require generation of an encryption key between the electronic device 101 and the external electronic device 102.

In operation 401, the electronic device 101 may store a network security policy. Although not illustrated in FIG. 4, a network manager may set, in the electronic device 101, the network security policy needed for managing the infrastructure of a network.

In operation 402, the electronic device 101 may receive an authentication request from the external electronic device 102. After searching for a desired network for establishing a wireless connection, the external electronic device 102 may transmit the authentication request to the electronic device 101.

In operation 403, the electronic device 101 may transmit an authentication response to the external electronic device 102. After analyzing the authentication request transmitted by the external electronic device 102, the electronic device 101 may transmit the authentication response corresponding to the authentication request to the external electronic device 102 seeking wireless connection.

In operation 404, the electronic device 101 may receive an association request from the external electronic device 102.

After the authentication information is successfully exchanged between the electronic device 101 and the external electronic device 102 via operations 402 and 403, the external electronic device 102 may transmit an association response to the external electronic device 102. For example, the electronic device 101 may transmit information regarding a first method for association through the association request, and a second method for association to the electronic device 101.

In operation 405, the electronic device 101 may transmit an association response to the external electronic device 102.

In operation 406, the electronic device 101 may transmit a handshake message including the network security policy to the external electronic device 102, to establish communicative association. For example, the electronic device 101 may generate a data encryption key, along with the external electronic device 102. This operation of generating an encryption key may be performed through a message handshake through which a plurality of messages may be transmitted and received. The message handshake may be applied when the external electronic device 102 is communicatively associated with the electronic device 101. The encryption key between the electronic device 101 and the external electronic device 102 may be generated through the message handshake, and the network security policy may be encrypted and transmitted from the electronic device 101 to the external electronic device 102 via the message handshake.

For example, the message handshake may represent a process of transmitting and receiving a plurality of messages between the electronic device 101 and the external electronic device 102. For example, when the electronic device 101 and the external electronic device 102 are communicatively associated with each other according to the 802.11 standard, the message handshake may be performed as a 4-way handshake through which messages are transmitted and received four times, to exchange the key between the electronic device 101 and the external electronic device 102.

For example, the electronic device 101 may transmit a message M1 to the external electronic device 102. The external electronic device 102 may extract "key nonce" from the message M1 to generate an encryption key, and transmit a message M2 to the electronic device 101. The electronic device 101 may transmit a message M3 in "key nonce" in the message M2 received from the external electronic device 102. For example, the message M3 may include the network security policy set in the electronic device 101. The network security policy may be generated in a format illustrated in FIG. 5 or 6, and be transmitted together with other information. When the external electronic device 102 verifies that the network security policy is included in the message M3, the external electronic device 102 may store the network security policy, and then transmit a message M4 to the electronic device 101. The external electronic device 102 may determine whether network traffic satisfies the network security policy by executing the network security policy included in the message M3.

In the 4-way handshake, the electronic device 101 may act as an authenticator, and the external electronic device 102 may act as a supplicant. During the 4-way handshake, the network security policy may be transmitted by inclusion in a third message. For example, the message M3 may be transmitted from the electronic device 101 to the external electronic device 102.

In operation 407, the network security policy provided by the electronic device 101 to the external electronic device 102 may be executed in the external electronic device 102. The external electronic device 102 may thus determine whether generated data traffic pending transmission to the electronic device 101 adheres to the network security policy shared with the same.

Although not illustrated in FIG. 4, an operation of determining whether the data traffic generated by the external electronic device 102 violates the network security policy may be performed by the external electronic device 102. When the data traffic generated by the external electronic device 102 violates the network security policy, the external electronic device 102 may apply a preset action to the data traffic. The network security policy may be used for filtering such that whether to transmit the data traffic generated by the external electronic device 102 to the electronic device 101 is determined.

For example, the external electronic device 102 may discard data traffic that violates the network security policy. The external electronic device 102 may provide a notification that the data traffic violating the network security policy occurs through a display (e.g., the display module 160 of FIG. 1) of the external electronic device 102. When the number of violations of the network security policy exceeds a preset number, a violation of the network security policy may be reported to the electronic device 101 to cancel the association between the external electronic device 102 and the electronic device 101.

In operation 408, the electronic device 101 may receive data traffic that satisfies the network security policy from the external electronic device 102. In some embodiments, the electronic device 101 may also receive data traffic that is not filtered through the network security policy applied to the external electronic device 102.

Accordingly, in operation 409, the electronic device 101 may detect whether some data traffic received from the external electronic device 102 violates the network security policy. Through operation 407 described above, violations of the network security policy are primarily determined by the external electronic device 102. However, as seen in operation 409, violations of the network security policy may be additionally determined by to the electronic device 101.

According to an embodiment, the external electronic device 102 may determine whether the entire data traffic violates the network security policy, and the electronic device 101 may sample a portion of the data traffic and determine whether the portion of the data traffic violates the network security policy.

According to an embodiment, a method of processing a network security policy performed by an electronic device (e.g., the electronic device 101 of FIG. 1 or 4) may include operation 401 of identifying a network security policy for network infrastructure, operation 402 of receiving an authentication request from an external electronic device (e.g., the external electronic device 102 of FIG. 4) to be associated with the electronic device, operation 403 of transmitting an authentication response to the authentication request to the external electronic device, operation 404 of receiving an association request from the external electronic device, operation 405 of transmitting an association response to the association request, operation 406 of transmitting the network security policy through a message handshake with the external electronic device, and operation 408 of receiving data traffic satisfying the network security policy from the external electronic device to which the network security policy is applied.

The network security policy may be shared from the electronic device 101 to the external electronic device 102 based on a VSIE (e.g., vendor characteristic information of FIG. 6) included in a message transmitted from the electronic device 101 to the external electronic device 102 through the message handshake.

The VSIE may include at least one of a type of the network security policy, a length of the network security policy, a name of the network security policy, a length of a rule, or a content of the rule.

The network security policy may be shared from the electronic device 101 in a message handshake process before the external electronic device 102 is associated with the electronic device 101.

The data traffic to be transmitted to the electronic device 101 may be transmitted to the electronic device 101 when the data traffic does not violate the network security policy applied to the external electronic device 102.

FIG. 5 is a diagram illustrating an example of elements for transmitting a network security policy according to an embodiment.

According to an embodiment, a VSIE may be used to transmit a network security policy. The electronic device 101 may share the network security policy with the external electronic device 102 through the VSIE. Referring to FIG. 5, the VSIE may include a tag number, a length, an organizationally unique identifier (OUI), and a type.

The tag number may be represented by 1 octet, which may represent 8 bits. The length may represent a length of the VSIE, which may be represented by 1 octet. The OUI may represent vendor identification information, which may be represented by 3 octets. The type may be represented by 1 octet.

FIG. 6 is a diagram illustrating an example of a network security policy provided to an external electronic device according to an embodiment.

FIG. 6 illustrates a configuration of the VSIE described above with reference to FIG. 5. A network security policy in the VSIE may be defined as follows.

Type of network security policy (i.e., "policy type");
Length of network security policy (i.e., "length of policy name");
Name of network security policy (i.e., "policy name");
Length of rule (i.e., "length of rule"); and
Content of rule (i.e., "rule text").

The type of the network security policy may be represented by a 1 octet, and differ for each vendor (e.g., a network traffic-related manufacturer or an application operator) of the electronic device 101. The length of the network security policy may represent a length of a name of the network security policy. The length of the rule may be represented by a 1 octet. The content of the rule may represent a description of the rule in the form of a text, and include an accessible IP address, a site name, or a domain name server (DNS).

A hash code may be used to verify the validity of the VSIE, and hashing may be executed in a payload that transmits the network security policy in the VSIE. A hash size may be 4 bytes, which may be initially used.

Figure 7:
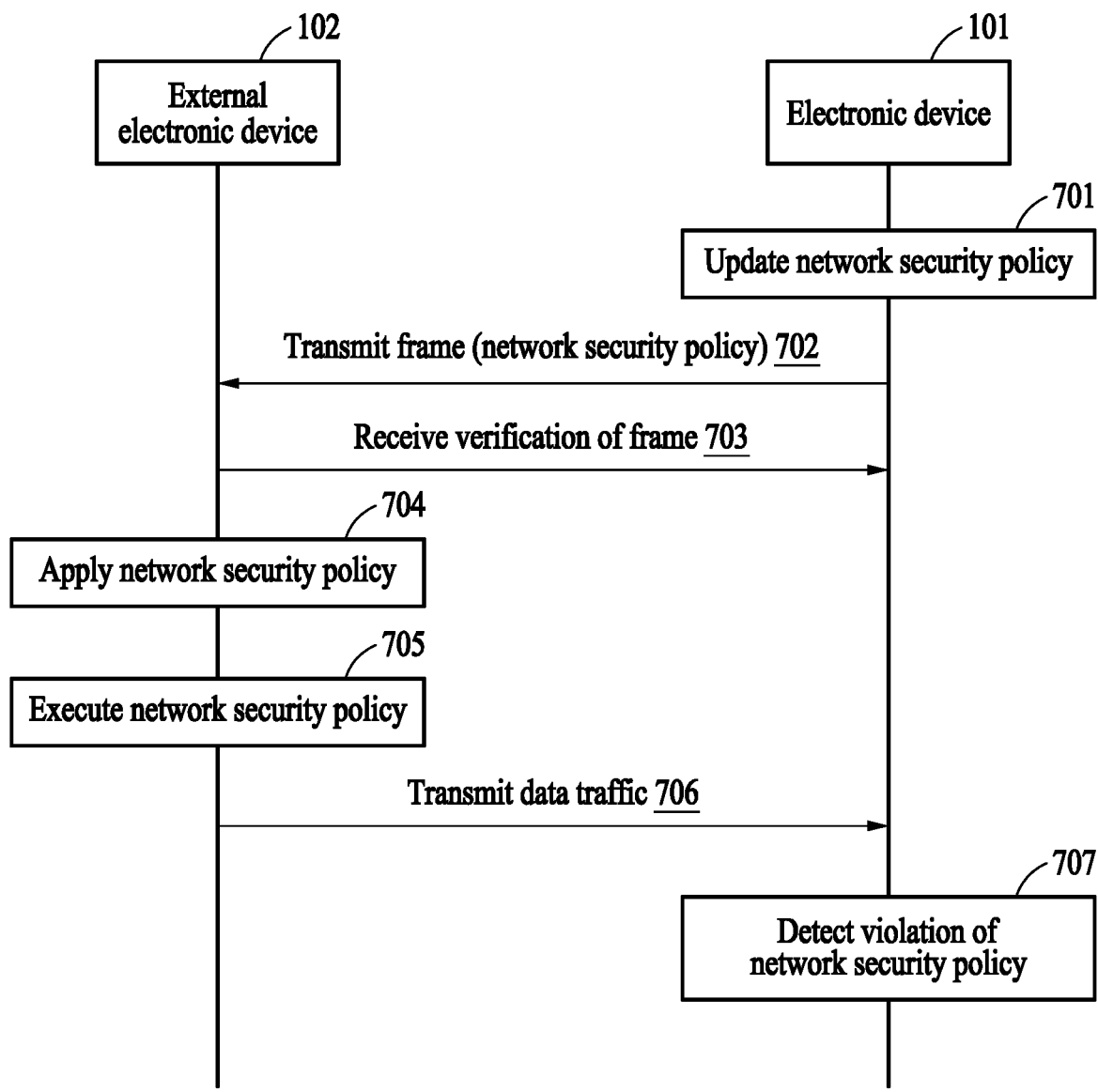
FIG. 7 is a diagram illustrating an example of providing an updated network security policy to an external electronic device according to an embodiment.

FIG. 7 is a diagram illustrating an example of providing an updated network security policy to an external electronic device according to an embodiment.

Operations to be described hereinafter with reference to FIG. 7 may be performed by a processor (e.g., the processor 120 of FIG. 1) of an electronic device 101.

The operations to be described hereinafter with reference to FIG. 7 may be performed when a network security policy is updated, after the network security policy is transmitted from the electronic device 101 to the external electronic device 102 through the operations described above with reference to FIGS. 3 and/or 4. The operations to be described hereinafter with reference to FIG. 7 may not necessarily be performed in sequential order.

In operation 701, the electronic device 101 may update the network security policy. The updated network security policy may be provided to the external electronic device 102.

In operation 702, the electronic device 101 may transmit a frame including the updated network security policy to the external electronic device 102. The frame may include an action frame, for example. The action frame may include a VSIE. As the electronic device 101 transmits the action frame including the VSIE to the external electronic device 102, the electronic device 101 may share the updated network security policy with the external electronic device 102.

In operation 703, the electronic device 101 may receive a response verifying reception of the frame from the external electronic device 102. The frame may include a hash code for verifying the validity of the VSIE. When a hash code for a pre-update network security policy, and a hash code for a post-update network security policy differ from each other, the external electronic device 102 may determine to apply the update to the pre-update network security policy.

In operation 704, the updated security policy, as provided from the electronic device 101 to the external electronic device 101, may be applied to the external electronic device 102.

In operation 705, the updated network security policy may be executed in the external electronic device 102.

Although not illustrated in FIG. 7, an operation of determining whether data traffic generated by the external electronic device 102 violates the updated network security policy may be performed by the external electronic device 102. When the data traffic generated by the external electronic device 102 violates the updated network security policy, the external electronic device 102 may apply a preset action to the data traffic. The updated network security policy may be used for filtering such that whether to transmit the data traffic generated by the external electronic device 102 to the electronic device 101 is determined.

In operation 706, the electronic device 101 may receive data traffic satisfying the updated network security policy from the external electronic device 102. However, in some embodiments, the electronic device 101 may nonetheless receive data traffic that was not filtered out via application of the updated network security policy by the external electronic device 102.

Accordingly, in operation 707, the electronic device 101 may detect whether the data traffic received from the external electronic device 102 violates the updated network security policy. That is, violations of the updated network security policy may be determined primarily by the external electronic device 102. However, in some embodiments, as seen in operation 707 described above, violations of the updated network security policy may be determined secondarily by the electronic device 101 as well.

For example, according to an embodiment, the external electronic device 102 may determine whether the totality of the data traffic violates the updated network security policy., The electronic device 101 may sample a portion of the data traffic and determine whether the sampled portion of the data traffic less than an entirety thereof violates the updated network security policy.

According to an embodiment, a method of processing a network security policy performed by an electronic device (e.g., the electronic device 101 of FIG. 1 or 7) may include operation 701 of identifying an updated network security policy for network infrastructure, operation 702 of transmitting a frame to an external electronic device (e.g., the external electronic device 102 of FIG. 7) with which a network security policy that is not updated is shared, operation 703 of receiving a verification of the frame from the external electronic device 102, and operation 706 of receiving data traffic that satisfies the network security policy from the external electronic device 102 to which the updated network security policy is applied. In operation 702, the frame may include the updated network security policy.

The frame may include an action frame (e.g., the action frame of FIG. 8), and the action frame may include information about a VSIE.

When a frame including the same content is not received within a preset period of time from a point in time at which the frame is received from the external electronic device 102, the electronic device 101 may further perform operation 707 of determining that the external electronic device 102 violates the updated network security policy.

The frame may include a hash code for verifying the validity the VSIE.

When a hash code for the network security policy that is not updated and a hash code of the updated network security policy differ from each other, the external electronic device 102 may update the network security policy that is not updated.

FIG. 8 is a diagram illustrating an example of a frame for providing an updated network security policy according to an embodiment.

A frame illustrated in FIG. 8 may include an action frame utilized under the 802.11 standard. The action frame may include a management control frame, and include a format such as the one illustrated in FIG. 8.

A category title may represent a type of information included in the action frame. For example, as per FIG. 8, when the category is "127," the information included in the action frame may represent a VSIE. Fields subsequent to the category may be variable, and the action frame may include an OUI field, a subtype field, a length field, and a VSIE field. An OUI may be represented by 3 octets, and a subtype may be defined as 0×EE. A VSIE may include a network security policy. A result of applying a hash function having a length of 4 bytes may be included after the VSIE field. For example, a first result may be obtained by applying a hash function for a network security policy already shared with the external electronic device 102. A second result may be obtained by applying a hash function transmitted through the action frame. When the first result and the second result differ from each other, the difference may indicate that the network security policy is updated.

The external electronic device 102 may retransmit, to the electronic device 101, data including the action frame received from the electronic device 101. For example, when the external electronic device 102 omits retransmission of the action frame to the electronic device 101 during a preset period of time, the electronic device 101 may determine that the network security policy is violated for the external electronic device 102, and execute a separate action associated with the violation of the network security policy.

Figure 9:
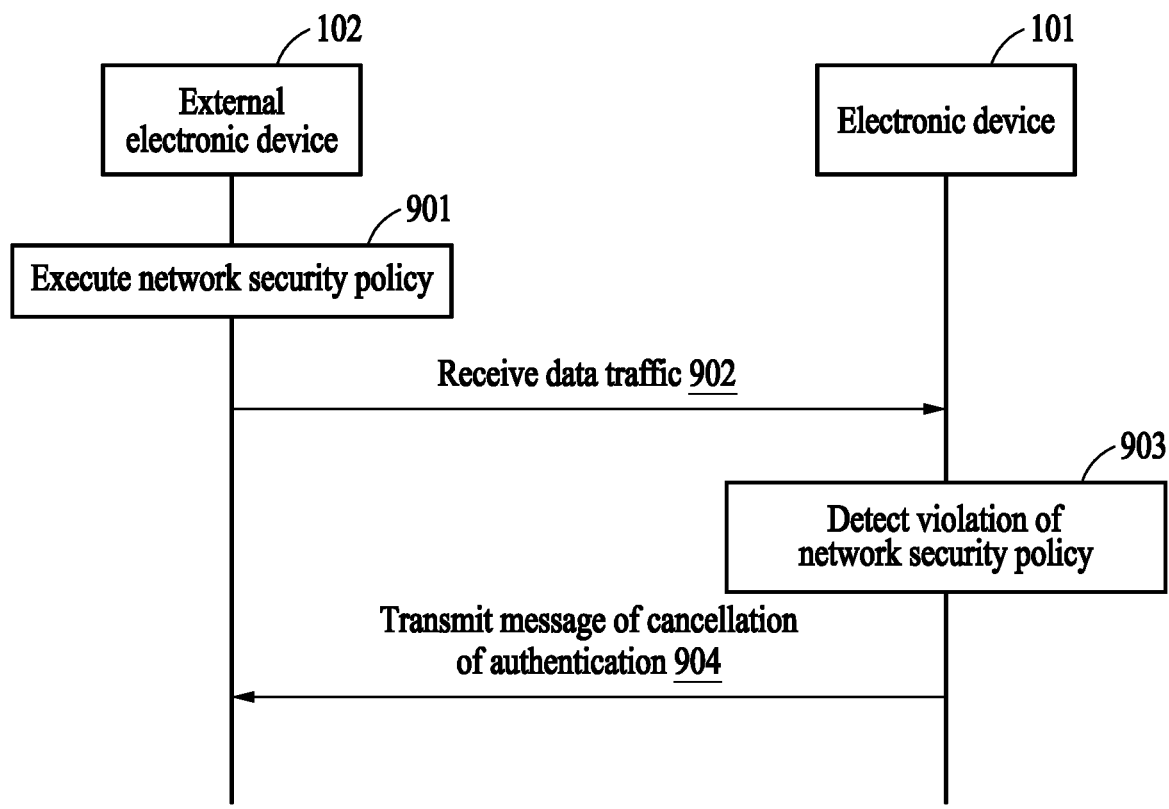
FIG. 9 is a diagram illustrating an example of operations performed when data traffic violates a network security policy according to an embodiment.

FIG. 9 is a diagram illustrating an example of operations performed when data traffic is determined to violate a network security policy according to an embodiment.

Operations to be described hereinafter with reference to FIG. 9 may be performed by a processor (e.g., the processor 120 of FIG. 1) of an electronic device 101. The operations to be described hereinafter with reference to FIG. 9 may not necessarily be performed in sequential order.

In operation 901, a network security policy shared by the electronic device 101 may be executed by an external electronic device 102.

In operation 902, the electronic device 101 may receive a transmission of data traffic from the external electronic device 102. The data traffic received in operation 902 may have been analyzed with respect to the network security policy by the external electronic device 102, and determined by the same to be compliant.

In operation 903, the electronic device 101 may detect whether the data traffic received from the external electronic device 102 violates the network security policy. Although not illustrated in FIG. 9, when the data traffic does not violate the network security policy, the electronic device 101 may forward the data traffic to network infrastructure.

When it is determined that the data traffic received from the external electronic device 102 violates the network security policy, the electronic device 101 may execute a separate action related to the violation of the network security policy. The violation of the network security policy may be determined by the electronic device 101. In some embodiments, violations may be detected by a specific execution entity on the network infrastructure to which the data traffic is forwarded, through the electronic device 101. When it is determined that data traffic received from the external electronic device 102 violates the network security policy, the electronic device 101 may cancel authentication of the external electronic device 102.

In operation 904, the electronic device 101 may transmit a message indicating the cancellation of authentication to the external electronic device 102, which originated transmission of the data traffic in violation of the network security policy.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and implemented for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the disclosure is strictly defined not by the detailed description, but by the claims and their equivalents, and all variations within the claims and their equivalents are to be construed as being included in the disclosure.

What is claimed is:

1. A method in an electronic device, comprising:
identifying a network security policy for a network;
receiving an authentication request from an external electronic device;
transmitting, to the external electronic device, an authentication response to the authentication request, the authentication response including a network security policy for the network;
receiving an association request to join the network from the external electronic device after the external electronic device receives the authentication response;
transmitting an association response to the association request permitting the external electronic device to join the network; and
receiving data traffic for the network from the external electronic device,
wherein the network security policy is applied by the external electronic device such that at least a first portion of the data traffic received from the external electronic device accords with the network security policy,
wherein the network security policy included with the authentication response is at least partially based on a vendor-specific information element (VSIE), and
wherein the VSIE includes at least one of a type of the network security policy, a length of the network security policy, a name of the network security policy, a length of a rule, or a content of the rule.

2. The method of claim 1, wherein the network security policy is transmitted from the electronic device to the external electronic device before the external electronic device is communicably associated with the electronic device, and
wherein the data traffic is analyzed by the external electronic device for compliance with the network security policy prior to transmittal to the electronic device via the network.

3. The method of claim 1, further comprising:
detecting whether any of the data traffic received from the external electronic device violates the network security policy; and
when a second portion of the data traffic received from the external electronic device violates the network security policy, executing a preset action with respect to the second portion of the data traffic.

4. A method in an electronic device, comprising:
identifying a network security policy for a network;
receiving an authentication request from an external electronic device;
transmitting, to the external electronic device, an authentication response to the authentication request;
receiving an association request to join the network from the external electronic device;
transmitting an association response to the association request;
transmitting the network security policy through a handshake message with the external electronic device permitting the external electronic device to join the network; and
receiving data traffic for the network from the external electronic device,
wherein the network security policy is applied by the external electronic device such that at least a first portion of the data traffic received from the external electronic device accords with the network security policy,
wherein the network security policy is included with the handshake message is at least partially based on a vendor-specific information element (VSIE), and
wherein the VSIE includes at least one of a type of the network security policy, a length of the network security policy, a name of the network security policy, a length of a rule, or a content of the rule.

5. The method of claim 4, wherein the network security policy is transmitted from the electronic device to the external electronic device during transmission of the handshake message, before the external electronic device joins the network with the electronic device, and
wherein the data traffic is analyzed by the external electronic device for compliance with the network security policy prior to transmittal to the electronic device via the network.

6. The method of claim 4, further comprising:
detecting whether any of the data traffic received from the external electronic device violates the network security policy; and
when a second portion of the data traffic received from the external electronic device violates the network security policy, executing a preset action with respect to the second portion of the data traffic.

7. A method in an electronic device, comprising:
identifying an update to a network security policy for a network;
transmitting a first frame to an external electronic device with which the network security policy is shared, wherein the first frame includes the update to the network security policy;
receiving a verification corresponding to the first frame from the external electronic device; and
receiving data traffic for the network from the external electronic device,
wherein the update to the network security policy is applied by the external electronic device such that at least a first portion of the received data traffic accords with the update to the network security policy,
wherein the first frame includes information about a vendor-specific information element (VSIE), and
wherein the VSIE includes at least one of a type of the network security policy, a length of the network security policy, a name of the network security policy, a length of a rule, or a content of the rule.

8. The method of claim 7, further comprising:
listening for reception of a second frame including a same content as the first frame,
based on detecting that the second frame is not received from the external electronic device within a preset time range from a timepoint at which the first frame is received, detecting a violation of the updated network security policy by the external electronic device.

9. The method of claim 7, further comprising:
detecting whether any of the data traffic received from the external electronic device violates the updated network security policy; and
when a second portion of the data traffic received from the external electronic device violates the updated network security policy, executing a preset action with respect to the second portion of the data traffic.

10. The method of claim 7, wherein the first frame includes a hash code for verifying a validity of a VSIE, and
wherein, when a hash code for the network security policy prior to updating is different from a hash code for the network security policy after applying the update, the external electronic device updates the network security policy.

\* \* \* \* \*